United States Patent
Crockett et al.

(10) Patent No.: US 7,461,002 B2
(45) Date of Patent: Dec. 2, 2008

(54) METHOD FOR TIME ALIGNING AUDIO SIGNALS USING CHARACTERIZATIONS BASED ON AUDITORY EVENTS

(75) Inventors: Brett G. Crockett, Brisbane, CA (US); Michael J. Smithers, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 763 days.

(21) Appl. No.: 10/478,398

(22) PCT Filed: Feb. 25, 2002

(86) PCT No.: PCT/US02/05806

§ 371 (c)(1),
(2), (4) Date: Nov. 20, 2003

(87) PCT Pub. No.: WO02/097791

PCT Pub. Date: Dec. 5, 2002

(65) Prior Publication Data

US 2004/0148159 A1 Jul. 29, 2004

Related U.S. Application Data

(63) Continuation-in-part of application No. PCT/US02/04317, filed on Feb. 12, 2002, and a continuation-in-part of application No. 10/045,644, filed on Jan. 11, 2002, now abandoned, said application No. PCT/US02/04317 is a continuation-in-part of application No. 10/045,644, filed on Jan. 11, 2002, now abandoned, which is a continuation-in-part of application No. 09/922,394, filed on Aug. 2, 2001, now abandoned, which is a continuation of application No. 09/834,739, filed on Apr. 13, 2001, now abandoned.

(60) Provisional application No. 60/351,498, filed on Jan. 23, 2002, provisional application No. 60/293,825, filed on May 25, 2001.

(51) Int. Cl.
*G10L 11/00* (2006.01)

(52) U.S. Cl. ............... 704/278; 704/200.1; 704/216

(58) Field of Classification Search ............ 704/216, 704/218, 237, 278, 500, 501, 503, 504
See application file for complete search history.

(56) References Cited

U.S. PATENT DOCUMENTS 4,464,784 A   8/1984   Agnello (Continued)

FOREIGN PATENT DOCUMENTS

EP   0372155   6/1990

(Continued)

OTHER PUBLICATIONS

Crockett, et al., "A Method for Characterizing and Identifying Audio Based on Auditory Scene Analysis," AES Convention Paper 6416, presented at the 118th Convention May 28-32, 2005, Barcelona, Spain.

(Continued)

*Primary Examiner*—Tālivaldis Ivars Šmits
*Assistant Examiner*—Douglas C Godbold
(74) *Attorney, Agent, or Firm*—Thomas A. Gallagher; Gallagher & Lathrop

(57) ABSTRACT

A method for time aligning audio signal, wherein one signal has been derived from the other or both have been derived from another signal, comprises deriving reduced-information characterizations of the audio signals, auditory scene analysis. The time offset of one characterization with respect to the other characterization is calculated and the temporal relationship of the audio signals with respect to each other is modified in response to the time offset such that the audio signals are coicident with each other. These principles may also be applied to a method for time aligning a video signal and an audio signal that will be subjected to differential time offsets.

13 Claims, 2 Drawing Sheets

U.S. PATENT DOCUMENTS

| | | | |
|---|---|---|---|
| 4,624,009 A | 11/1986 | Glenn et al. | |
| 4,700,391 A | 10/1987 | Leslie, Jr. et al. | |
| 4,703,355 A | 10/1987 | Cooper | |
| 4,723,290 A | 2/1988 | Watanabe et al. | |
| 4,792,975 A | 12/1988 | MacKay | |
| 4,852,170 A | 7/1989 | Bordeaux | |
| 4,864,620 A | 9/1989 | Bialick | |
| 4,905,287 A | 2/1990 | Segawa | |
| RE33,535 E | 2/1991 | Cooper | |
| 5,023,912 A | 6/1991 | Segawa | |
| 5,040,081 A * | 8/1991 | McCutchen | 386/66 |
| 5,092,216 A * | 3/1992 | Wadhams | 84/602 |
| 5,101,434 A | 3/1992 | King | |
| 5,175,769 A | 12/1992 | Hejna, Jr. | |
| 5,202,761 A * | 4/1993 | Cooper | 348/515 |
| 5,216,744 A | 6/1993 | Alleyne | |
| 5,235,646 A | 8/1993 | Wilde et al. | |
| 5,313,531 A | 5/1994 | Jackson | |
| 5,450,522 A * | 9/1995 | Hermansky et al. | 704/200.1 |
| 5,621,857 A | 4/1997 | Cole et al. | |
| 5,730,140 A | 3/1998 | Fitch | |
| 5,749,073 A | 5/1998 | Slaney | |
| 5,781,885 A | 7/1998 | Inoue | |
| 5,828,994 A | 10/1998 | Covell et al. | |
| 5,970,440 A | 10/1999 | Veldhuis et al. | |
| 6,002,776 A | 12/1999 | Bhadkamkar et al. | |
| 6,021,386 A | 2/2000 | Davis et al. | |
| 6,163,614 A | 12/2000 | Chen | |
| 6,188,439 B1 * | 2/2001 | Kim | 348/553 |
| 6,211,919 B1 | 4/2001 | Zink et al. | |
| 6,246,439 B1 * | 6/2001 | Zink et al. | 348/473 |
| 6,266,003 B1 | 7/2001 | Hoek | |
| 6,360,202 B1 | 3/2002 | Bhadkamkar et al. | |
| 6,430,533 B1 | 8/2002 | Kolluru et al. | |
| 6,490,553 B2 | 12/2002 | Van Thong et al. | |
| 2001/0027393 A1 | 10/2001 | Touimi et al. | |
| 2001/0038643 A1 | 11/2001 | McFarland | |
| 2002/0097882 A1 | 7/2002 | Greenberg et al. | |
| 2002/0116178 A1 | 8/2002 | Crockett | |
| 2004/0037421 A1 | 2/2004 | Truman | |
| 2004/0044525 A1 | 3/2004 | Vinton et al. | |
| 2004/0122662 A1 | 6/2004 | Crockett | |
| 2004/0122772 A1 | 6/2004 | Crockett | |
| 2004/0133423 A1 | 7/2004 | Crockett | |
| 2004/0148159 A1 | 7/2004 | Crockett | |
| 2004/0165730 A1 | 8/2004 | Crockett | |
| 2004/0172240 A1 | 9/2004 | Crockett et al. | |
| 2004/0184537 A1 | 9/2004 | Geiger et al. | |
| 2005/0078840 A1 | 4/2005 | Riedl | |
| 2006/0002572 A1 | 1/2006 | Smithers et al. | |

FOREIGN PATENT DOCUMENTS

| | | |
|---|---|---|
| EP | 0 525 544 A2 | 2/1993 |
| EP | 0525544 | 3/1993 |
| EP | 0608833 | 10/2001 |
| EP | 0865026 | 12/2003 |
| JP | 1074097 | 3/1989 |
| JP | 10074097 | 3/1998 |
| WO | WO 91/19989 | 12/1991 |
| WO | WO 91/20164 | 12/1991 |
| WO | WO 9119989 | 12/1991 |
| WO | WO 9627184 | 9/1996 |
| WO | WO 9701939 | 1/1997 |
| WO | WO 98/20482 | 5/1998 |
| WO | WO 9820482 | 5/1998 |
| WO | WO 99/29114 | 6/1999 |
| WO | WO 9933050 | 9/1999 |
| WO | WO 0013172 | 3/2000 |
| WO | WO 00/19414 | 4/2000 |
| WO | WO 0019414 | 4/2000 |
| WO | WO 00/45378 | 8/2000 |
| WO | WO 0045378 | 11/2000 |
| WO | WO 02/015587 | 2/2002 |
| WO | WO-02/084645 | 10/2002 |
| WO | WO 02/084645 A2 | 10/2002 |
| WO | WO-02/093560 | 11/2002 |
| WO | WO 02/093560 | 11/2002 |
| WO | WO-02/097702 | 12/2002 |
| WO | WO 02/097790 | 12/2002 |
| WO | WO-02/097790 | 12/2002 |
| WO | WO-02/097791 | 12/2002 |
| WO | WO 02/097792 | 12/2002 |
| WO | WO 03/069954 | 8/2003 |
| WO | WO 03/090208 | 10/2003 |
| WO | WO 04/073178 | 8/2004 |
| WO | WO 04/111994 | 12/2004 |
| WO | WO 2005/086139 | 9/2005 |
| WO | WO 06/006977 | 1/2006 |
| WO | WO 06/113047 | 10/2006 |
| WO | WO 06/113062 | 10/2006 |
| WO | WO 2006/013287 | 12/2006 |
| WO | WO 2007/016107 | 2/2007 |

OTHER PUBLICATIONS

Dolson, Mark, "The Phase Vocoder: A Tutorial," 1986, Computer Music Journal, 10(4):14-27.

Moulines, E., et al., "Pitch-Synchronous Waveform Processing Techniques for Text-to-Speech Synthesis Using Diphones," 1990, Speech Communication, 9(5/6):453-467.

Serra, X., et al., "Spectral Modeling Synthesis: A Sound Analysis/Synthesis System Based on a Deterministic Plus Stochastic Decomposition," 1990, In Proc. Of Int. Computer Music Conf., pp. 281-284, San Francisco, Ca.

Truax, Barry, "Discovering Inner Complexity: Time Shifting and Transposition with a Real-Time Granulation Technique," 1994, Computer Music J., 18(2):38-48.

Bregman, Albert S., "Auditory Scene Analysis—The Perceptual Organization of Sound," Massachusetts Institute of Technology, 1991, Fourth printer, 2001, Second MIT Press (Paperback ed.) $2^{nd}$, pp. 468-470.

Dattorro, J., "Effect Design Part I: Reverberator and Other Filters," 1997, J. Audio Eng. Soc., 45(9):660-684.

Dembo, A., et al., "Signal Synthesis from Modified Discrete Short-Time Transform," 1988, IEEE Trans Acoust., Speech, Signal Processing, ASSP 36(2):168-181.

Fairbanks, G., et al., "Method for Time or Frequency Compression-Expansion of Speech," 1954, IEEE Trans Audio and Electroacoustics, AU-2:7-12.

Griffin D., et al., "Multiband Excitation Vocoder," 1988, IEEE Trans. Acoust., Speech, Signal Processing, ASSP-36(2):236-243.

Laroche, J., "Autocorrelation Method for High Quality Time/Pitch Scaling," 1993, Procs. IEEE Workshop Appl. Of Signal Processing to Audio and Acoustics, Mohonk Mountain House, New Paltz, NY.

Laroche J., et al., "HNS: Speech Modification Based on Harmonic+Noise Model," 1993a, Proc. IEEE ECASSP-93, Minneapolis, pp. 550-553.

Laroche, J., "Time and Pitch Scale Modification of Audio Signals," Chapter 7 of "Applications of Digital Signal Processing to Audio and Acoustics," 1998, edited by Mark Kahrs and Karlheinz Brandenburg, Kluwer Academic Publishers.

Lee, F., "Time Compression and Expansion of Speech by the Sampling Method," 1972, J. Audio Eng. Soc., 20(9):738-742.

Lee, S., et al., "Variable Time-Scale Modification of Speech Using Transient Information," 1997, An IEEE Publication, pp. 1319-1322.

Lin, G.J., et al, "High Quality and Low Complexity Pitch Modification of Acoustic Signals," 1995, An IEEE Publication, pp. 2987-2990.

Makhoul, J., "Linear Predication: A tutorial Review," 1975, Proc. IEEE, 63(4):561-580.

Malah D., "Time-Domain Algorithms for Harmonic Bandwidth Reduction and Time Scaling of Speech Signals," 1979, IEEE Trans. On Acoustics, Speech, and Signal Processing ASSP-27(2):113-120.

Marques J., et al., "Frequency-Varying Sinusoidal Modeling of Speech," 1989, IEEE Trans. On Acoustics, Speech and Signal Processing, ASSP-37(5):763-765.

Moorer, J. A., "The Use of the Phase Vocoder in Computer Music Applications," 1978, J. Audio Eng. Soc., 26(1).

Press, William H., et al., "Numerical Recipes in C, The Art of Scientific Computing," 1988, Cambridge University Press, NY, pp. 432-434.

Portnoff, R., "Time-Scale Modifications of Speech Based on Short-Time Fourier Analysis," 1981, IEEE Trans. Acoust., Speech, Signal Processing 29(3):374-390.

Quatierei T., et al., "Speech Transformations Based on a Sinusoidal Representation," 1986, IEEE Trans on Acoustics, Speech and Signal Processing, ASSP-34(6):1449-1464.

Roehrig, C., "Time and Pitch Scaling of Audio Signals," 1990, Proc. 89th AES Convention, Los Angeles, Preprint 2954 (E-1).

Roucos, S., et al, "High Quality Time-Scale Modification of Speech," 1985, Proc. IEEE ICASSP-85, Tampa, pp. 493-496.

Shanmugan, K. Sam, "Digital and Analog Communication Systems," 1979, John Wiley & Sons, NY, pp. 278-280.

Schroeder, M., et al., "Band-Width Compression of Speech by Analytic-Signal Rooting," 1967, Proc. IEEE, 55:396-401.

Scott, R., et al., "Pitch-Synchronous Time Compression of Speech," 1972, Proceedings of the Conference for Speech Communication Processing, pp. 63-65.

Seneff, S., "System to Independently Modify Excitation and/or Spectrum of Speech Waveform without Explicit Pitch Extraction," 1982, IEEE Trans. Acoust., Speech, Signal Processing, ASSP-24:358-365.

Suzuki, R., et al., "Time-Scale Modification of Speech Signals Using Cross-Correlation Functions," 1992, IEEE Trans. on Consumer Electronics, 38(3):357-363.

Tan, Roland, K.C., "A Time-Scale Modification Algorithm Based on the Subband Time-Domain Technique for Broad-Band Signal Applications," May 2000, J. Audio Eng. Soc. vol. 48, No. 5, pp. 437-449.

Bristow-Johnson, Robert, "Detailed Analysis of a Time-Domain Formant-Corrected Pitch-Shifting Algorithm," May 1995, J. Audio Eng. Soc., vol. 43, No. 5, pp. 340-352.

George, E Bryan, et al., "Analysis-by-Synthesis/Overlap-Add Sinusoidal Modeling Applied to the Analysis and Synthesis of Musical Tones," Jun. 1992, J. Audio Eng. Soc., vol. 40, No. 6, pp. 497-515.

McAulay, Robert J., "Speech Analysis/Synthesis Based on a Sinusoidal Representation," Aug. 1986, IEEE Transactions on Acoustics, Speech and Signal Processing, vol. ASSP-34, No. 4, pp. 744-754.

Laroche, Jean, "Improved Phase Vocoder Time-Scale Modification of Audio," May 1999, IEEE Transactions on Speech and Audio Processing, vol. 7, No. 3, pp. 323-332.

Slyh, Raymond E., "Pitch and Time-Scale Modification of Speech: A Review of the Literature—Interim Report May 94-May 95," Armstrong Lab., Wright-Patterson AFB, OH, Crew Systems Directorate.

Audio Engineering Handbook, K. Blair Benson ed., McGraw Hill, San Francisco, CA 1988, pp. 1.40-1.42 and 4.8-4.10.

Tewfik, A.H., et al., "Enhanced Wavelet Based Audio Coder," Nov. 1, 1993, Signals, Systems and Computers, Conference Record of the 17th Asilomar Conference on Pacific Grove, CA, IEEE Comput. Soc pp. 896-900.

Vafin, R., et al., "Modifying Transients foe Efficient Coding of Audio," May 2001, IEEE International Conference on Acoustics, Speech and Signal Processing, pp. 3285-3288, vol. 5.

Vafin, R., et al., Improved Modeling of Audio Signals by Modifying Transient Locations, Oct. 2001, Proceeding of the 2001 IEEE Workshop on the Applications of Signal Processing to Audio and Acoustics, pp. 143-146.

Karjalainen, M., et al., "Multi-Pitch and Periodcity Analysis Model for Sound Separation and Auditory Scene Analysis," Mar. 1999, Proc. ICASSP'99, pp. 929-932.

Levine, S .N., "Effects Processing on Audio Subband Data," 1996, Proc. Int. Computer Music Conf., HKUST, Hong Kong, pp. 328-331.

Levine, S. N., et al., "A Switched Parametric & Transform Audio Coder," Mar. 1999, Proc. ICASSP'99, pp. 985-988.

Mermelstein, P., et al., "Analysis by Synthesis Speech Coding with Generalized Pitch Prediction," Mar. 1999, Proc. ICASSP'99, pp. 1-4.

Pollard, M. P., et al., "Enhanced Shape—Invariant Pitch and Time-Scale Modification for Concatenative Speech Synthesis," Oct. 1996, Proc. Int. Conf. For Spoken Language Processing , ICLSP'96, vol. 3, pp. 1433-1436.

Verma, T. S., et al., An Analysis/Synthesis Tool For Transient Signals that Allows a Flexible Sines+Transients+Noise Model for Audio, May 1998, Proc. ICASSP'98, pp. 3573-3576.

Verma, T. S., et al., "Sinusoidal Modeling Using Frame-Based Perceptually Weighted Matching Pursuits," Mar. 1999 Proc. ICASSP'99, pp. 981-984.

Yim, S., et al., "Spectral Transformation for Musical Tones via Time Domain Filtering," Oct. 1997, Proc. 1997 IEEE Workshop on Applications of Signal Processing to Audio and Acoustics, pp. 141-144.

Edmonds, E. A., et al., "Automatic Feature Extraction from Spectrograms for Acoustic-Phonetic Analysis," 1992 vol. II, Conference B: Pattern Recognition Methodology and Systems, Proceedings, 11th IAPR International Conference on the Hague, Netherlands, USE, IEEE Computer Soc., Aug. 30, 1992, pp. 701-704.

Fishbach, Alon, "Primary Segmentation of Auditory Scenes," 12th IAPR International Conference on Pattern Recognition, Oct. 9-13, 1994, vol. III Conference C: Signal Processing, Conference D: Parallel Computing, IEEE Computer Soc., pp. 113-117.

United States Patent and Trademark Office Sep. 10, 2007 Office Action for U.S. Appl. No. 10/478,538, filed Nov. 20, 2003, inventor, Brett Graham Crockett.

U.S. Appl. No. 10/474,387, filed Oct. 7, 2003, Brett Graham Crockett - Jul. 6, 2007 Office Action (DOL07503 US).

U.S. Appl. No. 10/474,387, filed Oct. 7, 2003, Brett Graham Crockett - Sep. 20, 2007 Response to Office Action (DOL07503 US).

PCT/US02/04317, filed Feb. 12, 2002 - International Search Report dated Oct. 15, 2002 (DOL07503 US).

Laroche, Jean, "Autocorrelation Method for High-Quality Time/Pitch-Scaling," Telecom Paris, Departement Signal, 75634 Paris Cedex 13. France, email: laroche@sig.enst.fr (DOL07503 US).

Australian Patent Office - Feb. 19, 2007 - Examiner's first report on application No. 2002248431 (DOL07503 US).

Chinese Patent Office - Apr. 22, 2005 - Notification of First Office Action for Application No. 02808144.7 (DOL07503 US).

Chinese Patent Office - Dec. 9, 2005 - Notification of Second Office Action for Application No. 02808144.7 (DOL07503 US).

Malaysian Patent Office - Apr. 7, 2006 - Substantive Examination Adverse Report - Section 30(1)/30(2)) for Application No. PI 20021371 (DOL07503 US).

U.S. Appl. No. 10/476,347, filed Oct. 28, 2003, Brett Graham Crockett - Feb. 12, 2007 Office Action (DOL091 US).

U.S. Appl. No. 10/476,347, filed Oct. 28, 2003, Brett Graham Crockett - May 14, 2007 Response to Office Action (DOL091 US).

PCT/US02/12957, filed Apr. 25, 2002 - International Search Report dated Aug. 12, 2002 (DOL091 US).

Vanfin, et al., "Modifying Transients for Efficient Coding of Audio," IEEE, pp. 3285-3288, Apr. 2001 (DOL091 US).

Vanfin, et al., "Improved Modeling of Audio Signals by Modifying Transient Locations," pp. W2001-W2001-4, Oct. 21-24, 2001, New Paltz, New York (DOL091 US).

Australian Patent Office - Feb. 26, 2007 - Examiner's first report on application No. 2002307533 (DOL091 US).

Chinese Patent Office - May 13, 2005 - Notification of First Office Action for Application No. 02809542.1 (DOL091 US).

Chinese Patent Office - Feb. 17, 2006 - Notification of Second Office Action for Application No. 02809542.1 (DOL091 US).

European Patent Office - Dec. 19, 2005 - Communication Pursuant to Article 96(2) for EP Application No. 02 769 666.5 - 2218 (DOL091 US).

Indian Patent Office - Jan. 3, 2007 - First Examination Report for Application No. 1308/KOLNP/2003 - J. (DOL091 US).

U.S. Appl. No. 10/478,397, filed Nov. 20, 2003, Brett G. Crockett - Feb. 27, 2007 Office Action (DOL092US).

U.S. Appl. No. 10/478,397, filed Nov. 20, 2003, Brett G. Crockett - May 29, 2007 Response to Office Action (DOL092US).

PCT/US02/05329, filed Feb. 22, 2002 - International Search Report dated Oct. 7, 2002 (DOL092 US).

Edmonds, et al., "Automatic Feature Extraction from Spectrograms for Acoustic-Phonetic Analysis," pp. 701-704, Lutchi Research Center, Loughborough University of Technology, Loughborough, U.K. (DOL092 US).

Chinese Patent Office - Mar. 10, 2006 - Notification of the First Office Action for Application No. 02810670.9 (DOL092 US).

U.S. Appl. No. 10/478,538, filed Nov. 20, 2003, Brett G. Crockett - Aug. 24, 2006 Office Action (DOL098 US).

U.S. Appl. No. 10/478,538, filed Nov. 20, 2003, Brett G. Crockett - Nov. 24, 2006 Response to Office Action (DOL098 US).

U.S. Appl. No. 10/478,538, filed Nov. 20, 2003, Brett G. Crockett - Feb. 23, 2007 Office Action (DOL098 US).

U.S. Appl. No. 10/478,538, filed Nov. 20, 2003, Brett G. Crockett - Jun. 25, 2007 Office Action (DOL098 US).

U.S. Appl. No. 10/478,538, filed Nov. 20, 2003, Brett G. Crockett - Sep. 10, 2007 Office Action (DOL098 US).

PCT/US02/05999, filed Feb. 26, 2002 - International Search Report dated Oct. 7, 2002 (DOL098 US).

Fishbach, Alon, Primary Segmentation of Auditory Scenes, IEEE, pp. 113-117, 1994 (DOL098 US).

Australian Patent Office - Mar. 9, 2007 - Examiner's first report on application No. 2002252143 (DOL098 US).

Chinese Patent Office - Dec. 31, 2004 - Notification of the First Office Action for Application No. 02810671.7 (DOL098 US).

Chinese Patent Office - Jul. 15, 2005 - Notification of Second Office Action for Application No. 02810671.7 (DOL098 US).

Chinese Patent Office - Apr. 28, 2006 - Notification of Third Office Action for Application No. 02810671.7 (DOL098 US).

Indian Patent Office - Nov. 23, 2006 First Examination Report for Application No. 01487/KOLNP/2003 - G (DOL098 US).

Indian Patent Office - Jul. 30, 2007 (Aug. 2, 2007) Letter from the Indian Patent Office for Application No. 01487/KOLNP/2003 - G (DOL098 US).

U.S. Appl. No. 10/591,374, filed Aug. 31, 2006, Mark Franklin Davis - Pending claims in application (DOL11505 US).

PCT/US2005/006359, filed Feb. 28, 2005 - International Search Report and Written Opinion dated Jun. 6, 2005 (DOL11505 US).

ATSC Standard: Digital Audio Compression (AC-3), Revision A, Doc A/52A, ATSC Standard, Aug. 20, 2001, pp. 1-140 (DOL11505 US).

Schuijers, E., et al.; "Advances in Parametric Coding for High-Quality Audio," Preprints of Papers Presented at the AES Convention, Mar. 22, 2003, pp. 1-11, Amsterdam, The Netherlands (DOL11505 US).

European Patent Office - Sep. 28, 2007 - Examination Report for Application No. 05 724 000.4 - 2225 (DOL11505 US).

European Patent Office - Jan. 26, 2007 - Communication pursuant to Article 96(2) EPC for Application No. 05 724 000.4 -2218 (DOL11505 US).

SG 200605858-0 Singapore Patent Written Opinion dated Oct. 17, 2007 based on PCT Application filed Feb. 28, 2005 (DOL11505 US).

U.S. Appl. No. 11/999,159 filed Dec. 3, 2007, Alan Jeffrey Seefeldt, et al. -Pending claims in application.(DOL16101 US).

PCT/US2006/020882, filed May 26, 2006 - International Search Report and Written Opinion dated Feb. 20, 2007 (DOL16101).

Faller, Christof, "Coding of Spatial Audio Compatible with Different Playback Formats," Audio Engineering Society Convention Paper, presented at the 117th Convention, pp. 1-12, Oct. 28-31, 2004 San Francisco, CA (DOL16101 US).

Herre, et al., "MP3 Surround: Efficient and Compatible Coding of Multi-Channel Audio," Audio Engineering Society Convention Paper, presented at the 116th Convention, pp. 1-14, May 8-11, 2004, Berlin, Germany (DOL16101 US).

Fielder, et al., "Introduction to Dolby Digital Plus, an Enhancement to the Dolby Digital Coding System," Audio Engineering Society Convention Paper, presented at the 117th Convention, pp. 1-29, Oct. 28-31, 2004, San Francisco, CA (DOL16101 US).

Herre, et al., "Spatial Audio Coding: Next-Generation Efficient and Compatible Coding of Multi-Channel Audio," Audio Engineering Society Convention Paper, presented at the 117th Convention, pp. 1-13, Oct. 1-13, 2004, San Francisco, CA (DOL16101 US).

Faller, Christof, "Parametric Coding of Spatial Audio," These No. 3062, pp. 1-164, (2004) Lausanne, EPFL (DOL16101 US).

Herre, et al., "The Reference Model Architecture for MPEG Spatial Audio Coding," Audio Engineering Society Convention Paper, presented at the 118th Convention, pp. 1-13, May 28-31, 2005, Barcelona, Spain (DOL16101 US).

Schuijers, et al., "Low Complexity Parametric Stereo Coding," Audio Engineering Society Convention Paper, presented at the 116th Convention, pp. 1-11, May 8-11, 2004, Berlin, Germany (DOL16101 US).

PCT/US2006/028874, filed Jul. 24, 2006 - Alan Jeffrey Seefeldt and Mark Stuart Vinton - Pending claims in application. (DOL16301 PCT).

PCT/US2007/008313, filed Mar. 30, 2007 - International Search Report and Written Opinion dated Sep. 21, 2007 (DOL186 PCT).

Blesser, B., "An Ultraminiature Console Compression System with Maximum User Flexibility," presented Oct. 8, 1971 at the 41st Convention of the Audio Engineering Society, New York, AES May 1972 vol. 20, No. 4, pp. 297-302 (DOL186 PCT).

Hoeg, W., et al., "Dynamic Range Control (DRC) and Music/Speech Control (MSC) Programme-Associated Data Services for DAB," EBU Review - Technical, European Broadcasting Union. Brussels, BE, No. 261, Sep. 21, 1994, pp. 56-70. (DOL186).

Brandenburg, K., "MP3 and AAC Explained," Proceedings of the International AES Conference, 1999, pp. 99-110.

Carroll, Tim, "Audio Metadata: You Can Get There From Here," Oct. 11, 2004, pp. 1-4, Retrieved from the Internet: URL:http://tvtechnology.com/features/audio_notes/f-TC-metadata-8.21.02.shtml.

Painter, T., et al., "Perceptual Coding of Digital Audio", Proceedings of the IEEE, New York, NY, vol. 88, No. 4, Apr. 2000, pp. 451-513.

Swanson, M. D., et al., "Multiresolution Video Watermarking Using Models and Scene Segmentation," Proceedings of the International Conference on Image Processing, Santa Barbara, Ca, Oct. 26-29, 1997, Los Alamitos, CA IEEE Computer Society, US, vol. 2, Oct. 1997, pp. 558-561.

Todd, et al., "AC-3: Flexible Perceptual Coding for Audio Transmission and Storage," 96th Convention of the Audio Engineering Society, Preprint 3796, Feb. 1994, pp. 1-16.

Smith, et al., "Tandem-Free VoIP Conference: A Bridge to Next-Generation Networks," IEEE Communications Magazine, May 2003, pp. 136-145.

Riedmiller Jeffrey C., "Solving TV Loudness Problems Can You 'Accurately' Hear the Difference," Communications Technology, Feb. 2004.

Moore, B. C. J., et al., "A Model for the Prediction of Thresholds, Loudness and Partial Loudness," Journal of the Audio Engineering Society, New York, NY vol. 45, No. 4, Apr. 1, 1997, pp. 224-240.

Glasberg, B. R., et al., "A Model of Loudness Applicable to Time-Varying Sounds," Audio Engineering Society, New York, NY, vol. 50, No. 5, May 2002, pp. 331-342.

Hauenstein, M., "A Computationally Efficient Algorithm for Calculating Loudness Patterns of Narrowband Speech," Acoustics, Speech and Signal Processing, 1997, IEEE International Conference, Munich, Germany, Apr. 21-24, 1997, Los Alamitos, CA USE, IEEE Comput. Soc. US Apr. 21, 1997, pp. 1311-1314.

Trappe, W., et al., "Key Distribution fro Secure Multimedia Multicasts via Data Embedding," 2001 IEEE International Conferences on Acoustics, Speech and Signal Processing Proceedings, Salt Lake City UT, May 7-11, 2001 IEEE International Conference on Acoustics, Speech and Signal Processing, New York, NY, IEEE, US, vol. 1 of 6, May 7, 2001, pp. 1449-1452.

Fit, Frank, "DTV Audio Processing: Exploring the New Frontier," OMNIA, Nov. 1998, pp. 1-3.

U.S. Appl. No. 10/478,538, filed Nov. 20, 2003, Brett G. Crockett, et al,. - Jan. 9, 2008 Response to Office Action.

* cited by examiner

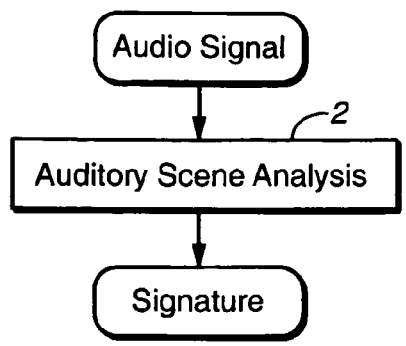
FIG._1A
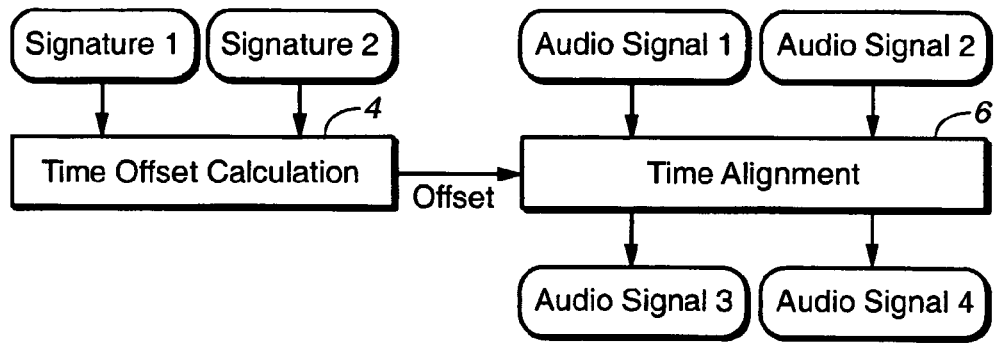
FIG._1B
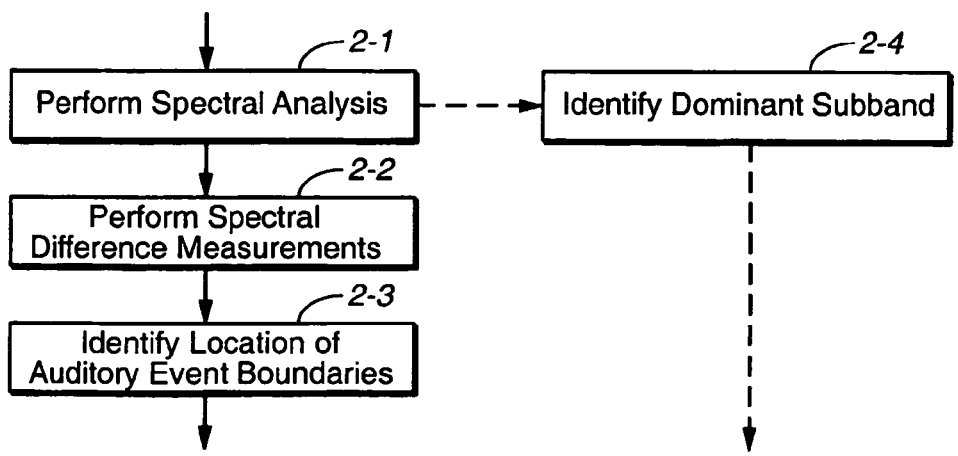
FIG._2

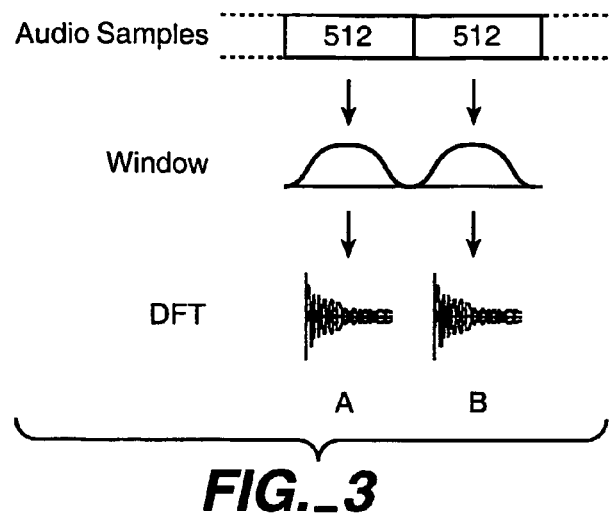
FIG._3
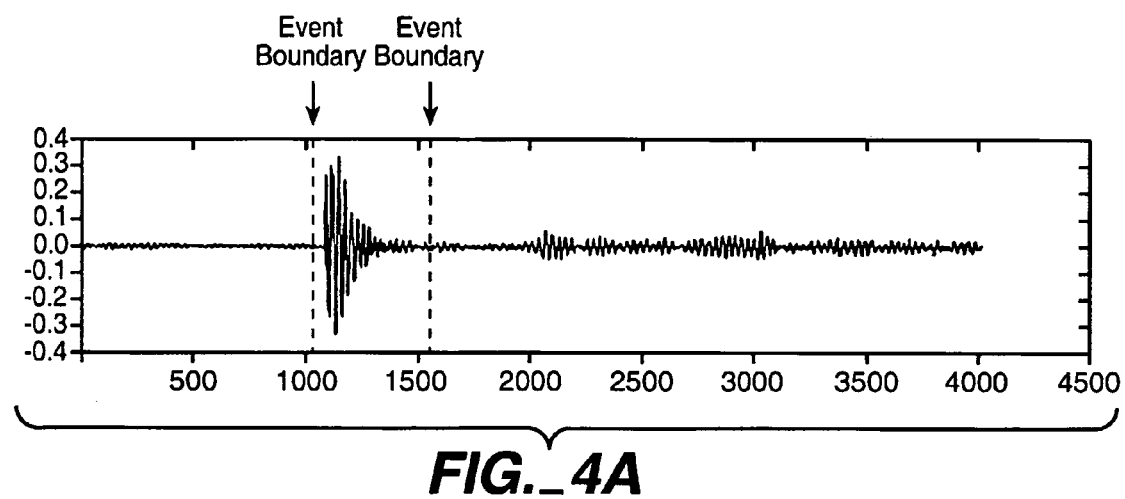
FIG._4A
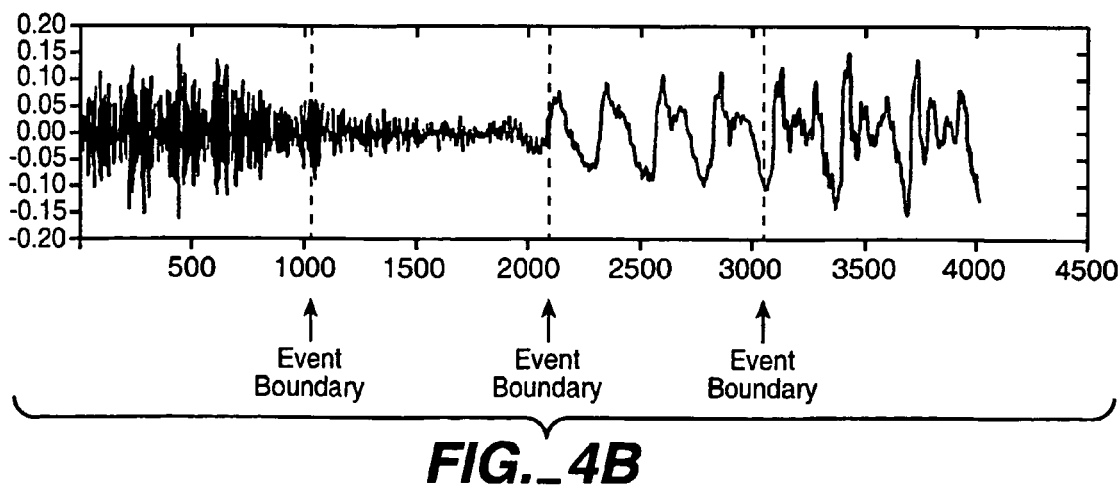
FIG._4B

US 7,461,002 B2

METHOD FOR TIME ALIGNING AUDIO SIGNALS USING CHARACTERIZATIONS BASED ON AUDITORY EVENTS

CROSS-REFERENCE TO RELATED APPLICATIONS AND PATENTS

The present application is related to U.S. Non-Provisional patent application Ser. No. 10/474,387, entitled "High Quality Time-Scaling and Pitch-Scaling of Audio Signals," by Brett Graham Crockett, filed Oct. 7, 2003, published as US 2004/0122662 on June 24, 2004. The PCT counterpart application was published as WO 02/084645 A2 on Oct. 24, 2002.

The present application is also related to U.S. Non-Provisional patent application Ser. No. 10/476,347, entitled "Improving Transient Performance of Low Bit Rate Audio Coding Systems by Reducing Pre-Noise," by Brett Graham Crockett, filed Oct. 28, 2003, published as US 2004/0133423 on Jul. 8, 2004, now U.S. Pat. No. 7,313,510. The PCT counterpart application was published as WO 02/093560 on Nov. 21, 2002.

The present application is also related to U.S. Non-Provisional patent application Ser. No. 10/478,397, entitled "Comparing Audio Using Characterizations Based on Auditory Events," by Brett Graham Crockett and Michael John Smithers, filed Nov. 20, 2003, published as 2004/0172240 on Sep. 2, 2004, now U.S. Pat. No. 7,283,954. The PCT counterpart application was published as WO 02/097790 on Dec. 5, 2002.

The present application is also related to U.S. Non-Provisional Patent Application Ser. No. 10/478,538, entitled "Segmenting Audio Signals into Auditory Events," by Brett Graham Crockett, filed Nov. 20, 2003, published as US 2004/0165730 on Aug. 26, 2004. The PCT counterpart application was published as WO 02/097792 on Dec. 5, 2002.

The present application is also related to U.S. Non-Provisional Patent Application Ser. No. 10/591,374, entitled "Multichannel Audio Coding:" by Mark Franklin Davis, filed Aug. 31, 2006. The PCT counterpart application was published as WO 05/086139 on Sep. 15, 2005.

The present application is also related to U.S. Non-Provisional Patent application Ser. N. 11/999,149, entitled "Channel Reconfiguration with Side Information," by Alan Jeffrey Seefeldt, Mark Stuart Vinton and Charles Quito Robinson, filed Dec. 3, 2007. The PCT counterpart application was published as WO 2006/013287 on Dec. 14, 2006.

The present application is also related to PCT Application (designating the U.S.) S.N. PCT/2006/028874, entitled "Controlling Spatial Audio Coding Parameters as a Function of Auditory Events," by Alan Jeffrey Seefeldt and Mark Stuart Vinton, filed Jul. 24, 2006. The PCT counterpart application was published as WO 07/016107 on Feb. 8, 2007.

The present application is also related to PCT Application (designating the U.S.), S.N. PCT/2007/008313, entitled "Audio Gain Control Using Specific-Loudness-Based Auditory Event Detection," by Brett Graham Crockett and Alan Jeffrey Seefeldt, filed Mar. 30, 2007. The PCT counterpart application was published as WO 2007/127023 on Nov. 8, 2007.

TECHNICAL FIELD

The invention relates to audio signals. More particularly, the invention relates to characterizing audio signals and using characterizations to time align or synchronize audio signals wherein one signal has been derived from the other or in which both have been derived from the same other signal. Such synchronization is useful, for example, in restoring television audio to video synchronization (lip-sync) and in detecting a watermark embedded in an audio signal (the watermarked signal is compared to an unwatermarked version of die signal). The invention may be implemented so that a low processing power process brings two such audio signals into substantial temporal alignment.

BACKGROUND ART

The division of sounds into units perceived as separate is sometimes referred to as "auditory event analysis" or "auditory scene analysis" ("ASA"). An extensive discussion of auditory scene analysis is set forth by Albert S. Bregman in his book *Auditory Scene Analysis—The Perceptual Organization of Sound*, Massachusetts Institute of Technology, 1991, Fourth printing, 2001, Second MIT Press paperback edition. In addition, U.S. Pat. No. 6,002,776 to Bhadkamkar, et al, Dec. 14, 1999 cites publications dating back to 1976 as "prior art work related to sound separation by auditory scene analysis." However, the Bhadkamkar, et al patent discourages the practical use of auditory scene analysis, concluding that "[t]echniques involving auditory scene analysis, although interesting from a scientific point of view as models of human auditory processing, are currently far too computationally demanding and specialized to be considered practical techniques for sound separation until fundamental progress is made."

Bregman notes in one passage that "[w]e hear discrete units when the sound changes abruptly in timbre, pitch, loudness, or (to a lesser extent) location in space." (*Auditory Scene Analysis—The Perceptual Organization of Sound*, supra at page 469). Bregman also discusses the perception of multiple simultaneous sound streams when, for example, they are separated in frequency.

There are many different methods for extracting characteristics or features from audio. Provided the features or characteristics are suitably defined, their extraction can be performed using automated processes. For example "ISO/IEC JTC 1/SC 29/WG 11" (MPEG) is currently standardizing a variety of audio descriptors as part of the MPEG-7 standard. A common shortcoming of such methods is that they ignore ASA. Such methods seek to measure, periodically, certain "classical" signal processing parameters such as pitch, amplitude, power, harmonic structure and spectral flatness. Such parameters, while providing useful information, do not analyze and characterize audio signals into elements perceived as separate according to human cognition.

Auditory scene analysis attempts to characterize audio signals in a manner similar to human perception by identifying elements that are separate according to human cognition. By developing such methods, one can implement automated processes that accurately perform tasks that heretofore would have required human assistance.

The identification of separately perceived elements would allow the unique identification of an audio signal using substantially less information than the full signal itself. Compact and unique identifications based on auditory events may be employed, for example, to identify a signal that is copied from another signal (or is copied from the same original signal as another signal).

DISCLOSURE OF THE INVENTION

A method is described that generates a unique reduced-information characterization of an audio signal that may be used to identify the audio signal. The characterization may be considered a "signature" or "fingerprint" of the audio signal.

According to the present invention, an auditory scene analysis (ASA) is performed to identify auditory events as the basis for characterizing an audio signal. Ideally, the auditory scene analysis identifies auditory events that are most likely to be perceived by a human listener even after the audio has undergone processing, such as low bit rate coding or acoustic transmission through a loudspeaker. The audio signal may be characterized by the boundary locations of auditory events and, optionally, by the dominant frequency subband of each auditory event. The resulting information pattern, constitutes a compact audio fingerprint or signature that may be compared to the fingerprint or signature of a related audio signal to determine quickly and/or with low processing power the time offset between the original audio signals. The reduced-information characteristics have substantially the same relative timing as the audio signals they represent.

The auditory scene analysis method according to the present invention provides a fast and accurate method of time aligning two audio signals, particularly music, by comparing signatures containing auditory event information. ASA extracts information underlying the perception of similarity, in contrast to traditional methods that extract features less fundamental to perceiving similarities between audio signals (such as pitch amplitude, power, and harmonic structure). The use of ASA improves the chance of finding similarity in, and hence time aligning, material that has undergone significant processing, such as low bit coding or acoustic transmission through a loudspeaker.

In the embodiments discussed below, it is assumed that the two audio signals under discussion are derived from a common source. The method of the present invention determines the time offset of one such audio signal with respect to the other so that they may be brought into approximate synchronism with respect to each other.

Although in principle the invention may be practiced either in the analog or digital domain (or some combination of the two), in practical embodiments of the invention, audio signals are represented by samples in blocks of data and processing is done in the digital domain.

Referring to FIG. 1A, auditory scene analysis 2 is applied to an audio signal in order to produce a "signature" or "fingerprint," related to that signal. In this case, there are two audio signals of interest. They are similar in that one is derived from the other or both have been previously derived from the same original signal. Thus, auditory scene analysis is applied to both signals. For simplicity, FIG. 1A shows only the application of ASA to one signal. As shown in FIG. 1B, the signatures for the two audio signals, Signature 1 and Signature 2, are applied to a time offset calculation function 4 that calculates an "offset" output that is a measure of the relative time offset between the two signatures.

Because the signatures are representative of the audio signals but are substantially shorter (i.e., they are more compact or have fewer bits) than the audio signals from which they were derived, the time offset between the signatures can be determined much faster than it would take to determine the time offset between the audio signals. Moreover, because the signatures retain substantially the same relative timing relationship as the audio signals from which they are derived, a calculation of the offset between the signatures is usable to time align the original audio signals. Thus, the offset output of function 4 is applied to a time alignment function 6. The time alignment function also receives the two audio signals, Audio signal 1 and Audio signal 2 (from which Signature 1 and 2 were derived), and provides two audio signal outputs, Audio signal 3 and Audio signal 4. It is desired to adjust the relative timing of Audio signal 1 with respect to Audio signal 2 so that they are in time alignment (synchronism) or are nearly in time alignment. To accomplish this, one may be time shifted with respect to the other or, in principle, both may be time shifted. In practice, one of the audio signals is a "pass through" of Audio signal 1 or Audio signal 2 (ie., it is substantially the same signal) and the other is a time shifted version of the other audio signal that has been temporally modified so that Audio Signal 3 and Audio Signal 4 are in time synchronism or nearly in time synchronism with each other, depending on the resolution accuracy of the offset calculation and time alignment functions. If greater alignment accuracy is desired, further processing may be applied to Audio Signal 3 and/or Audio Signal 4 by one or more other processes that form no part of the present invention.

The time alignment of the signals may be useful, for example, in restoring television audio to video synchronization (lip-sync) and in detecting a watermark embedded in an audio signal. In the former case, a signature of the audio is embedded in the video signal prior to transmission or storage that may result in the audio and video getting out of synchronism. At a reproduction point, a signature may be derived from the audio signal and compared to the signature embedded in the video signal in order to restore their synchronism. Systems of that type not employing characterizations based on auditory scene analysis are described in U.S. Pat. Nos. Re 33,535, 5,202,761, 6,211,919, and 6,246,439, all of which are incorporated herein by reference in their entireties. In the second case, an original version of an audio signal is compared to a watermarked version of the audio signal in order to recover the watermark. Such recovery requires close temporal alignment of the two audio signals. This may be achieved, at least to a first degree of alignment by deriving a signature of each audio signal to aid in time alignment of the original audio signals, as explained herein. Further details of FIGS. 1A and 1B are set forth below.

For some applications, the processes of FIGS. 1A and 1B should be real-time. For other applications, they need not be real-time. In a real-time application, the process stores a history (a few seconds, for example) of the auditory scene analysis for each input signal. Periodically, that event history is employed to update the offset calculation in order to continually correct the time offset. The auditory scene analysis information for each of the input signals may be generated in real time, or the information for either of the signals may already be present (assuming that some offline auditory scene analysis processing has already been performed). One use for a real-time system is, for example, an audio/video aligner as mentioned above. One series of event boundaries is derived from the audio; the other series of event boundaries is recovered from the video (assuming some previous embedding of the audio event boundaries into the video). The two event boundary sequences can be periodically compared to determine the time offset between the audio and video in order to improve the lip sync, for example.

Thus, both signatures may be generated from the audio signals at nearly the same time that the time offset of the signatures is calculated and used to modify the alignment of the audio signals to achieve their substantial coincidence. Alternatively, one of the signatures to be compared may be carried along with the audio signal from which it was derived, for example, by embedding the signature in another signal, such as a video signal as in the case of audio and video alignment as just described. As a further alternative, both signatures may be generated in advance and only the comparison and timing modification performed in real time. For example, in the case of two sources of the same television program (with both video and audio), both with embedded audio signatures; the respective television signals (with accompanying audio) could be synchronized (both video and audio) by comparing the recovered signatures. The relative timing relationship of the video and audio in each television signal would remain unaltered. The television signal synchronization would occur in real time, but neither signature would be generated at that time nor simultaneously with each other.

In accordance with aspects of the present invention, a computationally efficient process for dividing audio into temporal segments or "auditory events" that tend to be perceived as separate is provided.

A powerful indicator of the beginning or end of a perceived auditory event is believed to be a change in spectral content. In order to detect changes in timbre and pitch (spectral content) and, as an ancillary result, certain changes in amplitude, the audio event detection process according to an aspect of the present invention detects changes in spectral composition with respect to time. Optionally, according to a further aspect of the present invention, the process may also detect changes in amplitude with respect to time that would not be detected by detecting changes in spectral composition with respect to time.

In its least computationally demanding implementation, the process divides audio into time segments by analyzing the entire frequency band of the audio signal (full bandwidth audio) or substantially the entire frequency band (in practical implementations, band limiting filtering at the ends of the spectrum are often employed) and giving the greatest weight to the loudest audio signal components. This approach takes advantage of a psychoacoustic phenomenon in which at smaller time scales (20 milliseconds (msec) and less) the ear may tend to focus on a single auditory event at a given time. This implies that while multiple events may be occurring at the same time, one component tends to be perceptually most prominent and may be processed individually as though it were the only event taking place. Taking advantage of this effect also allows the auditory event detection to scale with the complexity of the audio being processed. For example, if the input audio signal being processed is a solo instrument, the audio events that are identified will likely be the individual notes being played. Similarly for an input voice signal, the individual components of speech, the vowels and consonants for example, will likely be identified as individual audio elements. As the complexity of the audio increases, such as music with a drumbeat or multiple instruments and voice, the auditory event detection identifies the most prominent (i.e., the loudest) audio element at any given moment. Alternatively, the "most prominent" audio element may be determined by taking hearing threshold and frequency response into consideration.

Optionally, according to further aspects of the present invention, at the expense of greater computational complexity, the process may also take into consideration changes in spectral composition with respect to time in discrete frequency bands (fixed or dynamically determined or both fixed and dynamically determined bands) rather than the full bandwidth. This alternative approach would take into account more than one audio stream in different frequency bands rather than assuming that only a single stream is perceptible at a particular time.

Even a simple and computationally efficient process according to an aspect of the present invention for segmenting audio has been found useful to identify auditory events.

An auditory event detecting process of the present invention may be implemented by dividing a time domain audio waveform into time intervals or blocks and then converting the data in each block to the frequency domain, using either a filter bank or a time-frequency transformation, such as a Discrete Fourier Transform (DFT) (implemented as a Fast Fourier Transform (FFT) for speed). The amplitude of the spectral content of each block may be normalized in order to eliminate or reduce the effect of amplitude changes. Each resulting frequency domain representation provides an indication of the spectral content (amplitude as a function of frequency) of the audio in the particular block. The spectral content of successive blocks is compared and each change greater than a threshold may be taken to indicate the temporal start or temporal end of an auditory event.

In order to minimize the computational complexity, only a single band of frequencies of the time domain audio waveform may be processed, preferably either the entire frequency band of the spectrum (which may be about 50 Hz to 15 kHz in the case of an average quality music system) or substantially the entire frequency band (for example, a band defining filter may exclude the high and low frequency extremes).

Preferably, the frequency domain data is normalized, as is described below. The degree to which the frequency domain data needs to be normalized gives an indication of amplitude. Hence, if a change in this degree exceeds a predetermined threshold, that too may be taken to indicate an event boundary. Event start and end points resulting from spectral changes and from amplitude changes may be ORed together so that event boundaries resulting from either type of change are identified.

In practical embodiments in which the audio is represented by samples divided into blocks, each auditory event temporal start and stop point boundary necessarily coincides with a boundary of the block into which the time domain audio waveform is divided. There is a trade off between real-time processing requirements (as larger blocks require less processing overhead) and resolution of event location (smaller blocks provide more detailed information on the location of auditory events).

As a further option, as suggested above, but at the expense of greater computational complexity, instead of processing the spectral content of the time domain waveform in a single band of frequencies, the spectrum of the time domain waveform prior to frequency domain conversion may be divided into two or more frequency bands. Each of the frequency bands may then be converted to the frequency domain and processed as though it were an independent channel. The resulting event boundaries may then be ORed together to define the event boundaries for that channel. The multiple frequency bands may be fixed, adaptive, or a combination of fixed and adaptive. Tracking filter techniques employed in audio noise reduction and other arts, for example, may be employed to define adaptive frequency bands (e.g., dominant simultaneous sine waves at 800 Hz and 2 kHz could result in two adaptively-determined bands centered on those two frequencies).

Other techniques for providing auditory scene analysis may be employed to identify auditory events in the present invention.

DESCRIPTION OF THE DRAWINGS

FIG. 1A is a flow chart showing the process of extraction of a signature from an audio signal in accordance with the present invention. The audio signal may, for example, represent music (e.g., a musical composition or "song").

FIG. 1B is a flow chart illustrating a process for the time alignment of two audio signal signals in accordance with the present invention.

FIG. 2 is a flow chart showing the process of extraction of audio event locations and the optional extraction of dominant subbands from an audio signal in accordance with the present invention.

FIG. 3 is a conceptual schematic representation depicting the step of spectral analysis in accordance with the present invention.

FIGS. 4A and 4B are idealized audio waveforms showing a plurality of auditory event locations and auditory event boundaries in accordance with the present invention.

BEST MODE FOR CARRYING OUT THE INVENTION

In a practical embodiment of the invention, the audio signal is represented by samples that are processed in blocks of 512 samples, which corresponds to about 11.6 msec of input audio at a sampling rate of 44.1 kHz. A block length having a time less than the duration of the shortest perceivable auditory event (about 20 msec) is desirable. It will be understood that the aspects of the invention are not limited to such a practical embodiment. The principles of the invention do not require arranging the audio into sample blocks prior to determining auditory events, nor, if they are, of providing blocks of constant length. However, to minimize complexity, a fixed block length of 512 samples (or some other power of two number of samples) is useful for three primary reasons. First, it provides low enough latency to be acceptable for real-time processing applications. Second, it is a power-of-two number of samples, which is useful for fast Fourier transform (FFT) analysis. Third, it provides a suitably large window size to perform useful auditory scene analysis.

In the following discussions, the input signals are assumed to be data with amplitude values in the range [−1,+1].

Auditory Scene Analysis 2 (FIG. 1A)

Following audio input data blocking (not shown), the input audio signal is divided into auditory events, each of which tends to be perceived as separate, in process 2 ("Auditory Scene Analysis") of FIG. 1A. Auditory scene analysis may be accomplished by an auditory scene analysis (ASA) process discussed above. Although one suitable process for performing auditory scene analysis is described in further detail below, the invention contemplates that other useful techniques for performing ASA may be employed.

FIG. 2 outlines a process in accordance with techniques of the present invention that may be used as the auditory scene analysis process of FIG. 1A. The ASA step or process 2 is composed of three general processing substeps. The first substep 2-1 ("Perform Spectral Analysis") takes the audio signal, divides it into blocks and calculates a spectral profile or spectral content for each of the blocks. Spectral analysis transforms the audio signal into the short-term frequency domain. This can be performed using any filterbank; either based on transforms or banks of band-pass filters, and in either linear or warped frequency space (such as the Bark scale or critical band, which better approximate the characteristics of the human ear). With any filterbank there exists a tradeoff between time and frequency. Greater time resolution, and hence shorter time intervals, leads to lower frequency resolution. Greater frequency resolution, and hence narrower subbands, leads to longer time intervals.

The first substep calculates the spectral content of successive time segments of the audio signal. In a practical embodiment, described below, the ASA block size is 512 samples of the input audio signal (FIG. 3). In the second substep 2-2, the differences in spectral content from block to block are determined ("Perform spectral profile difference measurements"). Thus, the second substep calculates the difference in spectral content between successive time segments of the audio signal. In the third substep 2-3 ("Identify location of auditory event boundaries"), when the spectral difference between one spectral-profile block and the next is greater than a threshold, the block boundary is taken to be an auditory event boundary. Thus, the third substep sets an auditory event boundary between successive time segments when the difference in the spectral profile content between such successive time segments exceeds a threshold. As discussed above, a powerful indicator of the beginning or end of a perceived auditory event is believed to be a change in spectral content. The locations of event boundaries are stored as a signature. An optional process step 2-4 ("Identify dominant subband") uses the spectral analysis to identify a dominant frequency subband that may also be stored as part of the signature.

In this embodiment, auditory event boundaries define auditory events having a length that is an integral multiple of spectral profile blocks with a minimum length of one spectral profile block (512 samples in this example). In principle, event boundaries need not be so limited.

Either overlapping or non-overlapping segments of the audio may be windowed and used to compute spectral profiles of the input audio. Overlap results in finer resolution as to the location of auditory events and, also, makes it less likely to miss an event, such as a transient. However, as time resolution increases, frequency resolution decreases. Overlap also increases computational complexity. Thus, overlap may be omitted. FIG. 3 shows a conceptual representation of non-overlapping 512 sample blocks being windowed and transformed into the frequency domain by the Discrete Fourier Transform (DFT). Each block may be windowed and transformed into the frequency domain, such as by using the DFT, preferably implemented as a Fast Fourier Transform (FFT) for speed.

The following variables may be used to compute the spectral profile of the input block:

N = number of samples in the input signal
M = number of windowed samples used to compute spectral profile
P = number of samples of spectral computation overlap
Q = number of spectral windows/regions computed In general, any integer numbers may be used for the variables above. However, the implementation will be more efficient if M is set equal to a power of 2 so that standard FFTs may be used for the spectral profile calculations. In a practical embodiment of the auditory scene analysis process, the parameters listed may be set to:

M = 512 samples (or 11.6 msec at 44.1 kHz)
P = 0 samples (no overlap)

The above-listed values were determined experimentally and were found generally to identify with sufficient accuracy the location and duration of auditory events. However, setting the value of P to 256 samples (50% overlap) has been found to be useful in identifying some hard-to-find events. While many different types of windows may be used to minimize spectral artifacts due to windowing, the window used in the spectral profile calculations is an M-point Hanning, Kaiser-Bessel or other suitable, preferably non-rectangular, window. The above-indicated values and a Hanning window type were selected after extensive experimental analysis as they have shown to provide excellent results across a wide range of audio material. Non-rectangular windowing is preferred for the processing of audio signals with predominantly low frequency content. Rectangular windowing produces spectral artifacts that may cause incorrect detection of events. Unlike certain codec applications where an overall overlap/add process must provide a constant level, such a constraint does not apply here and the window may be chosen for characteristics such as its time/frequency resolution and stop-band rejection.

In substep 2-1 (FIG. 2), the spectrum of each M-sample block may be computed by windowing the data by an M-point Hanning, Kaiser-Bessel or other suitable window, converting to the frequency domain using an M-point Fast Fourier Transform, and calculating the magnitude of the FFT coefficients. The resultant data is normalized so that the largest magnitude is set to unity, and the normalized array of M numbers is converted to the log domain. The array need not be converted to the log domain, but the conversion simplifies the calculation of the difference measure in substep 2-2. Furthermore, the log domain more closely matches the log domain amplitude nature of the human auditory system. The resulting log domain values have a range of minus infinity to zero. In a practical embodiment, a lower limit can be imposed on the range of values; the limit may be fixed, for example −60 dB, or be frequency-dependent to reflect the lower audibility of quiet sounds at low and very high frequencies. (Note that it would be possible to reduce the size of the array to M/2 in that the FFT represents negative as well as positive frequencies).

Substep 2-2 calculates a measure of the difference between the spectra of adjacent blocks. For each block, each of the M (log) spectral coefficients from substep 2-1 is subtracted from the corresponding coefficient for the preceding block, and the magnitude of the difference calculated (the sign is ignored). These M differences are then summed to one number. Hence, for the whole audio signal, the result is an array of Q positive numbers; the greater the number the more a block differs in spectrum from the preceding block. This difference measure could also be expressed as an average difference per spectral coefficient by dividing the difference measure by the number of spectral coefficients used in the sun (in this case M coefficients).

Substep 2-3 identifies the locations of auditory event boundaries by applying a threshold to the array of difference measures from substep 2-2 with a threshold value. When a difference measure exceeds a threshold, the change in spectrum is deemed sufficient to signal a new event and the block number of the change is recorded as an event boundary. For the values of M and P given above and for log domain values (in substep 2-1) expressed in units of dB, the threshold may be set equal to 2500 if the whole magnitude FFT (including the mirrored part) is compared or 1250 if half the FFT is compared (as noted above, the FFT represents negative as well as positive frequencies—for the magnitude of the FFT, one is the mirror image of the other). This value was chosen experimentally and it provides good auditory event boundary detection. This parameter value may be changed to reduce (increase the threshold) or increase (decrease the threshold) the detection of events.

The details of this practical embodiment are not critical. Other ways to calculate the spectral content of successive time segments of the audio signal, calculate the differences between successive time segments, and set auditory event boundaries at the respective boundaries between successive time segments when the difference in the spectral profile content between such successive time segments exceeds a threshold may be employed.

For an audio signal consisting of Q blocks (of size M samples), the output of the auditory scene analysis process of function 2 of FIG. 1A is an array B(q) of information representing the location of auditory event boundaries where q=0, 1, . . . , Q−1. For a block size of M=512 samples, overlap of P=0 samples and a signal-sampling rate of 44.1 kHz, the auditory scene analysis function 2 outputs approximately 86 values a second. Preferably, the array B(q) is stored as the signature, such that, in its basic form, without the optional dominant subband frequency information, the audio signal's signature is an array B(q) representing a string of auditory event boundaries.

An example of the results of auditory scene analysis for two different signals is shown in FIGS. 4A and 4B. The top plot, FIG. 4A, shows the results of auditory scene processing where auditory event boundaries have been identified at samples 1024 and 1536. The bottom plot, FIG. 4B, shows the identification of event boundaries at samples 1024, 2048 and 3072.

Identify Dominant Subband (Optional)

For each block, an optional additional step in the ASA processing (shown in FIG. 2) is to extract information from the audio signal denoting the dominant frequency "subband" of the block (conversion of the data in each block to the frequency domain results in information divided into frequency subbands). This block-based information may be converted to auditory-event based information, so that the dominant frequency subband is identified for every auditory event. This information for every auditory event provides the correlation processing (described below) with further information in addition to the auditory event boundary information. The dominant (largest amplitude) subband may be chosen from a plurality of subbands, three or four, for example, that are within the range or band of frequencies where the human ear is most sensitive. Alternatively, other criteria may be used to select the subbands.

The spectrum may be divided, for example, into three subbands. The preferred frequency range of the subbands is:

| | |
|---|---|
| Subband 1 | 301 Hz to 560 Hz |
| Subband 2 | 560 Hz to 1938 Hz |
| Subband 3 | 1938 Hz to 9948 Hz |

To determine the dominant subband, the square of the magnitude spectrum (or the power magnitude spectrum) is summed for each subband. This resulting sum for each subband is calculated and the largest is chosen. The subbands may also be weighted prior to selecting the largest. The weighting may take the form of dividing the sum for each subband by the number of spectral values in the subband, or alternatively may take the form of an addition or multiplication to emphasize the importance of a band over another. This can be useful where some subbands have more energy on average than other subbands but are less perceptually important.

Considering an audio signal consisting of Q blocks, the output of the dominant subband processing is an array DS(q) of information representing the dominant subband in each block (q=0, 1, ..., Q-1). Preferably, the array DS(q) is stored in the signature along with the array B(q). Thus, with the optional dominant subband information, the audio signal's signature is two arrays B(q) and DS(q), representing, respectively, a string of auditory event boundaries and a dominant frequency subband within each block. Thus, in an idealized example, the two arrays could have the following values (for a case in which there are three possible dominant subbands).

| 1 | 0 | 1 | 0 | 0 | 0 | 1 | 0 | 0 | 1 | 0 | 0 | 0 | 0 | 0 | 1 | 0 | (Event Boundaries) |
|---|---|---|---|---|---|---|---|---|---|---|---|---|---|---|---|---|---|
| 1 | 1 | 2 | 2 | 2 | 2 | 1 | 1 | 1 | 3 | 3 | 3 | 3 | 3 | 3 | 1 | 1 | (Dominant Subbands) |

In most cases, the dominant subband remains the same within each auditory event, as shown in this example, or has an average value if it is not uniform for all blocks within the event. Thus, a dominant subband may be determined for each auditory event and the array DS(q) may be modified to provide that the same dominant subband is assigned to each block within an event.

Time Offset Calculation

The output of the Signature Extraction (FIG. 1A) is one or more arrays of auditory scene analysis information that are stored as a signature, as described above. The Time Offset Calculation function (FIG. 1B) takes two signatures and calculates a measure of their time offset. This is performed using known cross correlation methods.

Let $S_1$ (length $Q_1$) be an array from Signature 1 and $S_2$ (length $Q_2$) an array from Signature 2. First, calculate the cross-correlation array $R_{E_1 E_2}$ (see, for example, John G. Proakis, Dimitris G. Manolakis, *Digital Signal Processing: Principles, Algorithms, and Applications*, Macmillan Publishing Company, 1992, ISBN 0-02-396815-X).

$$R_{E_1 E_2}(l) = \sum_{q=-\infty}^{\infty} S_1(q) \cdot S_2(q-l) \quad l = 0, \pm 1, \pm 2, ... \quad (1)$$

In a practical embodiment, the cross-correlation is performed using standard FFT based techniques to reduce execution time.

Since both $S_1$ and $S_2$ are finite in length, the non-zero component of $R_{E_1 E_2}$ has a length of $Q_1 + Q_2 - 1$. The lag l corresponding to the maximum element in $R_{E_1 E_2}$ represents the time offset of $S_2$ relative to $S_1$.

$$l_{peak} = l \text{ for } MAX(R_{E_1 E_2}(l)) \quad (2)$$

This offset has the same units as the signature arrays $S_1$ and $S_2$. In a practical implementation, the elements of $S_1$ and $S_2$ have an update rate equivalent to the audio block size used to generate the arrays minus the overlap of adjacent blocks: that is, M-P=512-0=512 samples. Therefore the offset has units of 512 audio samples.

Time Alignment

The Time Alignment function 6 (FIG. 1B) uses the calculated offset to time align the two audio signals. It takes as inputs, Audio Signals 1 and 2 (used to generate the two signatures) and offsets one in relation to the other such that they are both more closely aligned in time. The two aligned signals are output as Audio Signals 3 and 4. The amount of delay or offset applied is the product of the relative signature delay $l_{peak}$ between signature $S_2$ and $S_1$, and the resolution M-P, in samples, of the signatures.

For applications where only the passage common to the two sources is of interest (as in the case of watermark detection where unmarked and marked signals are to be directly compared), the two sources may be truncated to retain only that common passage.

For applications where no information is to be lost, one signal may be offset by the insertion of leading samples. For example let $x_1(n)$ be the samples of Audio Signal 1 with a length of $N_1$ samples, and $x_2(n)$ be the samples of Audio Signal 2 with a length of $N_2$ samples. Also $l_{peak}$ represents the offset of $S_2$ relative to $S_1$ in units of M-P audio samples.

The sample offset $D_{21}$ of Audio Signal 2 relative to Audio Signal 1 is the product of the signature offset $l_{peak}$ and M-P.

$$D_{21} = l_{peak} \cdot (M-P) \quad (3)$$

If $D_{21}$ is zero, the both input signals are output unmodified as signals 3 and 4 (see FIG. 1B). If $D_{21}$ is positive then input signal $x_1(n)$ is modified by inserting leading samples.

$$x_1'(m) = \begin{cases} 0 & 0 \leq m < D_{21} \\ x_1(n) & 0 \leq n < L_1 \quad m = n + D_{21} \end{cases} \quad (4)$$

Signals $x_1(n)$ and $x_2(n)$ are output as Signals 3 and 4 (see FIG. 1B). If $D_{21}$ is negative then input signal $x_2(n)$ is modified by inserting leading samples.

$$x_2'(m) = \begin{cases} 0 & 0 \leq m < -D_{21} \\ x_2(n) & 0 \leq n < L_2 \quad m = n - D_{21} \end{cases} \quad (5)$$

Computation Complexity and Accuracy

The computational power required to calculate the offset is proportional to the lengths of the signature arrays, $Q_1$ and $Q_2$. Because the process described has some offset error, the time alignment process of the present invention may be followed by a conventional process having a finer resolution that works directly with the audio signals, rather than signatures. For example such a process may take sections of the aligned audio signals (slightly longer than the offset error to ensure some overlap) and cross correlate the sections directly to determine the exact sample error or fine offset.

Since the signature arrays are used to calculate the sample offset, the accuracy of the time alignment method is limited to the audio block size used to generate the signatures: in this implementation, 512 samples. In other words this method will have error in the sample offset of approximately plus/minus half the block size: in this implementation ±256 samples.

This error can be reduced by increasing the resolution of the signatures; however there exists a tradeoff between accuracy and computational complexity. Lower offset error requires finer resolution in the signature arrays (more array elements) and this requires higher processing power in computing the cross correlation. Higher offset error requires coarser resolution in the signature arrays (less array elements) and this requires lower processing power in computing the cross correlation.

APPLICATIONS

Watermarking involves embedding information in a signal by altering the signal in some predefined way, including the addition of other signals, to create a marked signal. The detection or extraction of embedded information often relies on a comparison of the marked signal with the original source. Also the marked signal often undergoes other processing including audio coding and speaker/microphone acoustic path transmission. The present invention provides a way of time aligning a marked signal with the original source to then facilitate the extraction of embedded information.

Subjective and objective methods for determining audio coder quality compare a coded signal with the original source, used to generate the coded signal, in order to create a measure of the signal degradation (for example an ITU-R 5 point impairment score). The comparison relies on time alignment of the coded audio signal with the original source signal. This method provides a means of time aligning the source and coded signals.

Other applications of the invention are possible, for example, improving the lip-syncing of audio and video signals, as mentioned above.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

The present invention and its various aspects may be implemented as software functions performed in digital signal processors, programmed general-purpose digital computers, and/or special purpose digital computers. Interfaces between analog and digital signal streams may be performed in appropriate hardware and/or as functions in software and/or firmware.

The invention claimed is:

1. A method for time aligning first and second audio signals, wherein one signal has been derived from the other or both have been derived from another signal, comprising
   deriving reduced-information characterizations of said audio signals, the characterizations being composed of less information than the audio signals themselves, wherein said reduced-information characterizations represent at least the boundaries of auditory events resulting from the division of each of said audio signals into auditory events, each of which auditory events tends to be perceived as separate and distinct, wherein each audio signal is divided into auditory events by
      detecting changes in signal characteristics with respect to time in the audio signal, and
      identifying a continuous succession of auditory event boundaries in the audio signal, in which every change in signal characteristics with respect to time exceeding a threshold defines a boundary, wherein each auditory event is an audio segment between adjacent boundaries and there is only one auditory event between such adjacent boundaries, each boundary representing the end of the preceding event and the beginning of the next event such that a continuous succession of auditory events is obtained, wherein neither auditory event boundaries, auditory events, nor any characteristics of an auditory event are known in advance of identifying the continuous succession of auditory event boundaries and obtaining the continuous succession of auditory events,
   the characterizations having substantially the same relative timing relationship as the audio signals from which they are derived,
      calculating the time offset of one characterization with respect to the other characterization, and
      modifying the temporal relationship of said audio signals with respect to each other in response to said time offset such that said audio signals are more closely aligned in time.

2. The method of claim 1 wherein each of said audio signals is accompanied by a respective other signal and wherein each of said reduced-information characterizations, prior to said calculating and modifying, is embedded into the respective other signal that is carried with the audio signal from which the respective reduced-information characterization was derived.

3. The method of claim 2 wherein said other signals are video signals.

4. A method for time aligning an audio signal and another signal comprising
   deriving a reduced-information characterization of the audio signal and embedding said characterization in the other signal when the audio signal and other signal are substantially in synchronism, wherein said characterization represents at least the boundaries of auditory events resulting from the division or said audio signal into auditory events, each of which auditory events tends to be perceived as separate and distinct, wherein the audio signal is divided into auditory events by
      detecting changes in signal characteristics with respect to time in the audio signal, and
      identifying a continuous succession of auditory event boundaries in the audio signal, in which every change in signal characteristics with respect to time exceeding a threshold defines a boundary, wherein each auditory event is an audio segment between adjacent boundaries and there is only one auditory event between such adjacent boundaries, each boundary representing the end of the preceding event and the beginning of the next event such that a continuous succession of auditory events is obtained, wherein neither auditory event boundaries, auditory events, nor any characteristics of an auditory event are known in advance of identifying the continuous succession of auditory event boundaries and obtaining the continuous succession of auditory events,
   recovering the embedded characterization of said audio signal from said other signal after said audio signal and said other signal have been subjected to differential time offsets and deriving a reduced-information characterization of said audio signal from said audio signal in the same way the embedded characterization of the audio signal was derived based on auditory scene analysis,
   calculating the time offset of one characterization with respect to the other characterization,
   modifying the temporal relationship of the audio signal with respect to the other signal in response to said time offset such that the audio signal and other signal are more closely aligned in time.

5. The method of claim 4 wherein said other signal is a video signal.

6. The method of claim 1 wherein calculating a time offset includes performing a cross-correlation of said characterizations.

7. The method of claim 4 wherein calculating a time offset includes performing a cross-correlation of said characterization.

8. The method of any one of claims 1-6 and 7 wherein said reduced-information characterizations also represent the dominant frequency subband of each of said auditory events.

9. A method for time aligning an audio signal and one other signal, which signals are subjected to differential time offsets during storage or transmission comprising before said audio signal and said other signal have been subjected to differential time offsets, deriving a first reduced-information characterization of the audio signal, and embedding said first characterization in the other signal, wherein said first characterization represents at least the boundaries of auditory events resulting from the division of said audio signal into auditory events, each of which auditory events tends to be perceived as separate and distinct, wherein the audio signal is divided into auditory events by detecting changes in signal characteristics with respect to time in the audio signal, and identifying a continuous succession of auditory event boundaries in the audio signal, in which every change in signal characteristics with respect to time exceeding a threshold defines a boundary, wherein each auditory event is an audio segment between adjacent boundaries and there is only one auditory event between such adjacent boundaries, each boundary representing the end of the preceding event and the beginning of the next event such that a continuous succession of auditory events is obtained, wherein neither auditory event boundaries, auditory events, nor any characteristics of an auditory event are known in advance of identifying the continuous succession of auditory event boundaries and obtaining the continuous succession of auditory events, after said audio signal and said other signal have been subjected to differential time offsets, recovering the embedded first characterization of said audio signal from said other signal and recovering a second reduced-information characterization from said audio signal in the same way the first characterization of the audio signal was derived based on auditory scene analysis, the first and second characterizations each being composed of less information than the audio signal from which each is derived, calculating the tune offset of the first characterization with respect to the second characterization, and modifying the temporal relationship of the audio signal with respect to the other signal in response to said time offset such that the audio signal and other signal are more closely aligned in time.

10. A method for time aligning an audio signal and another signal, which signals have been subjected to differential time offsets during storage or transmission after a first reduced-information characterization had been derived from the audio signal and embedded in the other signal, said characterization representing at least the boundaries of auditory events resulting from the division of said audio signal into auditory events, each of which auditory events tends to be perceived as separate and distinct, wherein the audio signal is divided into auditory events by detecting changes in signal characteristics with respect to time in the audio signal, and identifying a continuous succession of auditory event boundaries in the audio signal, in which every change in signal characteristics with respect to time exceeding a threshold defines a boundary, wherein each auditory event is an audio segment between adjacent boundaries and there is only one auditory event between such adjacent boundaries, each boundary representing the end of the preceding event and the beginning of the next event such that a continuous succession of auditory events is obtained, wherein neither auditory event boundaries, auditory events, nor any characteristics of an auditory event are known in advance of identifying the continuous succession of auditory event boundaries and obtaining the continuous succession of auditory events, comprising recovering the embedded first characterization of said audio signal from said other signal and deriving a second reduced-information characterization from said audio signal in the same way the first characterization of the audio signal was derived based on auditory scene analysis, the first and second characterizations each being composed of less information than the audio signal from which each is derived, calculating die time offset of to first characterization with respect to the second characterization, and modifying the temporal relationship of the audio signal with respect to the other signal in response to said time offset such that the audio signal and other signal are more closely aligned in time.

11. The method of claim 9 or 10 wherein said other signal is a video signal.

12. The method of claim 9 or 10, wherein calculating a time offset includes performing a cross-correlation of said characterizations.

13. The method of claim 9 or claim 10 wherein said reduced-information characterizations also represent the dominant frequency subband of each of said auditory events.

* * * * *